United States Patent
Wang et al.

(10) Patent No.: US 10,455,429 B2
(45) Date of Patent: Oct. 22, 2019

(54) INTER-RADIO ACCESS TECHNOLOGY SPECTRUM SHARING

(71) Applicant: Google LLC, Mountain View, CA (US)

(72) Inventors: Jibing Wang, Saratoga, CA (US); Erik Richard Stauffer, Sunnyvale, CA (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 15/917,257

(22) Filed: Mar. 9, 2018

(65) Prior Publication Data

US 2019/0281469 A1    Sep. 12, 2019

(51) Int. Cl.
| | | |
|---|---|---|
| *H04W 16/14* | (2009.01) | |
| *H04W 76/15* | (2018.01) | |
| *H04W 92/02* | (2009.01) | |
| *H04W 88/10* | (2009.01) | |
| *H04W 88/06* | (2009.01) | |

(52) U.S. Cl.
CPC .......... *H04W 16/14* (2013.01); *H04W 76/15* (2018.02); *H04W 92/02* (2013.01); *H04W 88/06* (2013.01); *H04W 88/10* (2013.01)

(58) Field of Classification Search
CPC ..... H04W 16/14; H04W 76/15; H04W 92/02; H04W 88/06; H04W 88/10
See application file for complete search history.

(56) References Cited

U.S. PATENT DOCUMENTS

| | | | |
|---|---|---|---|
| 2013/0279376 A1 | 10/2013 | Ahmadi | |
| 2014/0128074 A1* | 5/2014 | Vangala | H04W 36/22 455/436 |
| 2015/0188650 A1 | 7/2015 | Au et al. | |
| 2015/0237645 A1 | 8/2015 | Andrianov et al. | |
| 2016/0057504 A1 | 2/2016 | Shelby et al. | |
| 2016/0269943 A1 | 9/2016 | Ji et al. | |
| 2017/0257774 A1 | 9/2017 | Ghosh et al. | |
| 2018/0084562 A1* | 3/2018 | Ramamurthi | H04W 72/085 |
| 2018/0152955 A1* | 5/2018 | Park | H04W 36/0027 |
| 2018/0324827 A1* | 11/2018 | Abraham | H04W 72/1215 |

OTHER PUBLICATIONS

"International Search Report and Written Opinion", PCT Application No. PCT/US2019/012788, dated Mar. 14, 2019, 16 pages.

* cited by examiner

*Primary Examiner* — Duc C Ho

(74) *Attorney, Agent, or Firm* — Colby Nipper

(57) ABSTRACT

The present disclosure describes techniques for, and systems that enable, inter-radio access technology spectrum sharing. For example, a wireless network provider can cause a legacy wireless network to share temporarily available communication resources with a new wireless network. By enabling the legacy wireless network to share its frequency spectrum with the new wireless network, the wireless network provider can temporarily expand a frequency spectrum of the new wireless network. By doing so, the wireless network can better utilize advantages of the new wireless network and provide a better experience to user devices equipped with the new communication technology.

20 Claims, 10 Drawing Sheets

INTER-RADIO ACCESS TECHNOLOGY SPECTRUM SHARING

BACKGROUND

With recent advances in wireless technology, people are becoming increasingly reliant on communicating via wireless user devices. These user devices are demanding an ever-increasing bandwidth from wireless networks for communicating high volumes of data with a low tolerance for latency. Additionally, people are using multiple user devices on the wireless networks, which magnifies the demands placed upon the wireless networks. For this reason, wireless network providers are continuously developing improvements to infrastructure, such as improved antenna arrays and radio access technologies, to increase bandwidth and a quantity of user devices supported by the wireless network.

However, when a provider begins implementing a new technology in the infrastructure, the provider must also support legacy user devices. Legacy user devices may not have hardware or software that allows them to connect to the wireless network implementing the new technology. Therefore, the provider must provide a wireless network using legacy technology for legacy user devices and another wireless network using improved technology for user devices that support the improved technology.

SUMMARY

This document describes techniques for, and systems that enable, inter-radio access technology spectrum sharing. For example, a wireless network provider can cause a legacy wireless network to share temporarily available communication resources with a new wireless network. By enabling the legacy wireless network to share its frequency spectrum with the new wireless network, the wireless network provider can temporarily expand a frequency spectrum of the new wireless network. Doing so allows the wireless network to better-utilize advantages of the new wireless network and provide a better experience to user devices equipped with the new communication technology.

In some aspects, a base station provides a wireless network over a first set of communication resources. The wireless network uses a first radio access technology (RAT) to provide the wireless network. The base station then receives a notification that additional communication resources are temporarily available to the base station. The additional communication resources are useable by the base station to increase a bandwidth of the wireless network. Further, the additional communication resources were previously allocated to another wireless network using a second RAT that is different from the first RAT. After receiving the notification, the base station provides the wireless network over a second set of communication resources, which includes the additional communication resources. Then, based on the additional communication resources no longer being available to the base station, the base station provides the wireless network over a third set of communication resources that excludes the additional communication resources.

In other aspects, a base station communicates with a user device over a wireless connection of a first wireless network. The wireless connection is established over a first set of communication resources using a first RAT. The base station receives a notification that additional communication resources are temporarily available to the base station for communicating with the user device. The additional communication resources were previously allocated to a second wireless network using a second RAT that is different from the first RAT. The base station then transmits, to the user device, a grant of a second set of communication resources that includes a portion of the additional communication resources. The user device and the base station communicate over the second set of communication resources. Then, based on the additional communication resources being unavailable, the base station transmits another grant of a third set of communication resources. The base station then communicates with the user device over the third set of communication resources.

In further aspects, a base station provides a wireless network over a first set of communication resources using a first RAT. The base station determines that a portion of the first set of communication resources are temporarily available for use by another base station of another wireless network. The base station transmits, to the other base station, a notification that the portion of the first set of communication resources are available to the other base station for a time interval. The other base station provides the other wireless network using a second RAT that is different from the first RAT. The base station then determines that the portion of the first set of communication resources are unavailable for use by the other base station and again provides the wireless network over the first set of communication resources including the portion of the first set of communication resources.

The details of one or more implementations are set forth in the accompanying drawings and the following description. Other features and advantages will be apparent from the description and drawings, and from the claims. This summary is provided to introduce subject matter that is further described in the Detailed Description and Drawings. Accordingly, this summary should not be considered to describe essential features nor used to limit the scope of the claimed subject matter.

BRIEF DESCRIPTION OF THE DRAWINGS

The details of one or more aspects of inter-radio access technology spectrum sharing is described below. The use of the same reference numbers in different instances in the description and the figures may indicate like elements.

DETAILED DESCRIPTION

A wireless network provider generally has a frequency spectrum across which it has rights to broadcast. When a new communication technology is developed, the wireless network provider provides a new wireless network over a portion of the frequency spectrum. The wireless network provider often must use another portion of the frequency spectrum to allow for legacy user devices to communicate over a legacy wireless network. However, the new wireless network often has advantages over the legacy wireless network, but maintaining the legacy wireless network limits a frequency spectrum and bandwidth allocated to the new wireless network.

This document describes techniques and systems for inter-radio access technology (inter-RAT) spectrum sharing. These techniques may include two base stations that operate under two different RATs. For example, a first base station provides a first wireless network using a first set of communication resources and a first RAT. The first RAT is a new, or advanced, RAT such as a 5th generation new radio (5G NR) RAT. A second base station provides a second network using a second set of communication resources and a second RAT. The second RAT is a legacy, or less-advanced, RAT such as a long term evolution (LTE) protocol (e.g., 4G). The second base station notifies the first base station that communication resources, which had been previously allocated to the second wireless network, are available for the first base station for providing the first wireless network. The first base station then expands the first wireless network to utilize the available communication resources The available communication resources may be available for a set time interval or may be available until a trigger event occurs, such as exceeding a threshold quantity of devices communicating with the second base station. After the available communication resources are no longer available, the first base station ceases providing the first wireless network over the available communication resources, and the second base station resumes providing the second wireless network over the available wireless network.

Using the techniques as systems of inter-RAT spectrum sharing described herein, a wireless network provider can expand a frequency bandwidth of a new wireless network to dynamically phase out a legacy wireless network based on needs of the wireless networks. By doing so, the wireless network provider can better-utilize advantages of the new wireless network to provide a better experience to growing numbers of user devices equipped with the new communication technology.

The following discussion describes an operating environment and techniques that may be employed in the operating environment and/or network environment. In the context of the present disclosure, reference is made to the operating environment or networking environment by way of example only.

Operating Environment

Figure 1:
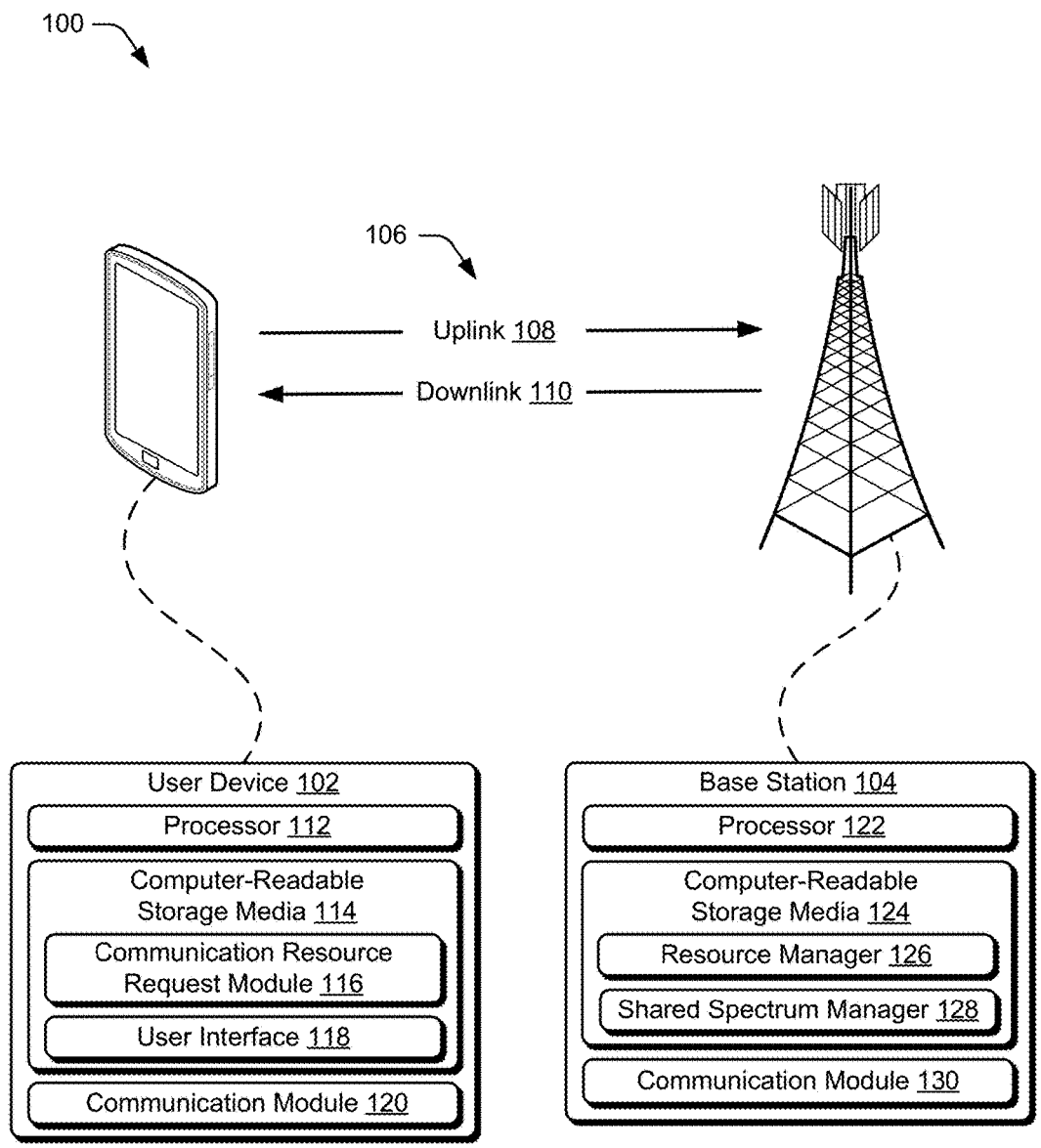
FIG. 1 illustrates example device configurations of a user device and a base station in accordance with one or more aspects of inter-radio access technology spectrum sharing.

FIG. 1 illustrates an example operating environment 100 in which devices for inter-RAT spectrum sharing can be implemented. In this example, the operating environment includes a user device 102 and a base station 104 that are respectively configured to communicate over a wireless connection 106 of a wireless network. Generally, the wireless connection 106 includes an uplink 108 by which the user device 102 transmits data to the base station 104 and a downlink 110 by which the base station 104 transmits other data to the user device 102, such as grants for further communications. Although shown or described with reference to a separate uplink 108 or downlink 110, communication between the user device 102 and base station 104 may also be referenced as a wireless association, a frame exchange, a wireless link, or a communication link.

The wireless connection 106 may be implemented in accordance with any suitable protocol or standard, such as a Global System for Mobile Communications (GSM), Worldwide Interoperability for Microwave Access (WiMax), a High Speed Packet Access (HSPA), Evolved HSPA (HSPA+) protocol, an LTE protocol, an LTE Advanced protocol, a 5G NR protocol, or a future advanced protocol. The protocol may operate based on frequency division duplexing (FDD) or time division duplexing (TDD). The wireless connection 106 may operate over a high bandwidth, such as a bandwidth greater than 1 GHz. Further, the wireless connection 106 may be configured to allow for operation at high frequencies, such as frequencies above 3 GHz, as well as lower frequencies, such as those between 0.5 GHz and 3 GHz.

The user device 102 includes a processor 112, computer-readable storage media 114 having a communication resource request module 116 and a user interface 118, and a communication module 120. The user device 102 is illustrated as a smart phone, however the user device may instead be implemented as any device with wireless communication capabilities, such as a mobile gaming console, a tablet, a laptop, an advanced driver assistance system (ADAS), a point-of-sale (POS) terminal, a health monitoring device, a drone, a camera, a media-streaming dongle, a wearable smart-device, an internet-of-things (IoT) device, a personal media device, a navigation device, a mobile-internet device (MID), a wireless hotspot, a femtocell, a smart vehicle, or a broadband router.

The processor 112 of the user device 102 can execute processor-executable instructions or code stored by the computer-readable storage media (CRM) 114 to cause the user device 102 to perform operations or implement various device functionalities. In some cases, the processor 112 is implemented as an application processor (e.g., multicore processor) or a system-on-chip with other components of the user device integrated therein. The CRM 114 may include any suitable type of memory media or storage media, such as read-only memory (ROM), programmable ROM (PROM), random access memory (RAM), static RAM (SRAM), or Flash memory. In the context of this discussion, the CRM 114 of the user device 102 is implemented as hardware-based storage media, which does not include transitory signals or carrier waves. In some cases, the CRM 114 stores one or more of firmware, an operating system, or applications of the user device 102 as instructions, code, or information. The instructions or code can be executed by the processor 112 to implement various functionalities of the user device 102, such as those related to network access or audio encoding features. In this example, the CRM 114 also stores processor-executable code or instructions for implementing one or more of the communication resource request module 116 or the user interface 118 of the user device 102.

In some aspects, the communication resource request module 116 may request, from the base station 104, communication resources for communication over the uplink 108 or the downlink 110. For example, the communication resource request module 116 may cause the user device 102 to transmit, via a physical uplink control channel (PUCCH) a request for a grant of communication resources to transmit application data to the base station 104.

In other aspects, the user interface 118 can provide information to, and receive input from, a user. For example, the user interface 118 may display an option to request an increased bandwidth for communicating with the base station 104. Upon receiving an input selecting the option, the user device 102 can transmit a request to the base station 104 to increase a bandwidth of the wireless connection 106. The base station 104 may then request, from another base station, available communication resources to increase a bandwidth of the wireless connection 106.

The request for communication resources is transmitted to the base station 104 using the communication module 120. The communication module 120 of the user device 102 includes a hardware-based transceiver and associated circuitry or other components for communicating with the base station 104 via a wireless medium. For example, the communication module 120 may transmit, via a transmitter of the transceiver, data to the base station 104 via one or more channels of the uplink 108. This data transmitted to the base station 104 may include any suitable type of framed or packetized information, such as a device location, a sounding reference signal (SRS), a PRACH communication, device status information, wireless connection status information, wireless connection control information, data requests, data, or network access requests. The communication module 120 may also receive, via a receiver of the transceiver, other data from the base station 104, such as application data, downlink pilots, primary or secondary synchronization signals (PSSs or SSSs), a master information block (MIB), a system information block (SIB), a downlink schedule, an uplink schedule, wireless connection configuration settings, network control information, or a communication mode selection.

In this example, the base station 104 is shown generally as a cellular base station of a wireless network. The base station 104 may be implemented to manage a cell of a wireless network that includes multiple other base stations that each manage another respective cell of the wireless network. As such, the base station 104 may communicate with a network management entity or others of the multiple base stations to coordinate connectivity or hand-offs of mobile stations within or across the cells of the wireless network. Further, the base station 104 may be configured to communicate via multiple wireless networks using different RATs. The base station 104 may communicate via multiple wireless networks using multiple antenna arrays at the base station 104. Under these configurations, the base station 104 may be referenced as a first base station and a second base station, even though the base station 104 may be a single structure at a single location.

The base station 104 can be configured as any suitable type of base station or network management node, such as a Global System for Mobile Communications (GSM) base station, a node base (Node B) transceiver station (e.g., for UMTS), an evolved NodeB (eNB, e.g., for LTE), or a next generation Node B (gNB, e.g., for 5G NR). As such, the base station 104 may control or configure parameters of the uplink 108 or the downlink 110 in accordance with one or more of the wireless standards or protocols described herein.

The base station 104 includes a processor 122, a computer-readable storage media (CRM) 124 having a resource manager 126 and a shared spectrum manager 128, and a communication module 130. The processor 122 can execute processor-executable instructions or code stored by the CRM 124 to perform operations or implement various base station functionalities. In some cases, the processor 122 is implemented as multiple processor cores or a multicore processor configured to execute firmware or an operating system of the base station 104. The CRM 124 may include any suitable type of memory media or storage media, such as ROM, PROM, RAM, SRAM, or Flash memory. In the context of this discussion, the CRM 124 is implemented as hardware-based storage media, which does not include transitory signals or carrier waves. The CRM 124 of the base station 104 may store firmware, an operating system, or applications of the base station as instructions, code, or other information. The instructions or code can be executed by the processor 122 to implement various functionalities of the base station 104, such as to manage connectivity or parameters of the wireless connection 106 with the user device 102. In this example, the CRM 124 also stores processor-executable code or instructions for implementing the resource manager 126 and the shared spectrum manager 128 of the base station 104.

In some aspects, the resource manager 126 of the base station 104 is implemented to perform various functions associated with allocating physical access (e.g., resource blocks) or communication resources available to the base station 104. The physical access, such as an air interface of the base station 104, may be partitioned or divided into various units (e.g., frames) of one or more of bandwidth, time, symbols, or layers. For example, within a framework of a 5G NR protocol, the resource manager 126 can allocate bandwidth and time intervals of access in resource blocks, each of which may be allocated in whole, or in part, to one or more channels for communicating with the user device 102. The resource blocks may include multiple subcarriers, each of which spans a portion of a frequency domain of the resource blocks. The subcarriers may be further divided into resource elements, each of which spans a portion of a time domain of the subcarriers. Consequently, a resource block includes multiple resource elements that can be grouped into subcarriers with other resource elements having a common frequency.

In some aspects, the shared spectrum manager 128 receives a notification of available communication resources from another base station of another wireless network. The shared spectrum manager 128 identifies the available communication resources to the resource manager 126 for allocating to wireless connections with user devices, such as the wireless connection 106 with the user device 102. In some implementations, before receiving the notification, the shared spectrum manager 128 transmits a request for available communication resources to the other base station. The request may be transmitted based on monitoring requests from user devices for communication resources. Alternatively, the shared spectrum manager 128 may receive unrequested notifications from the other base station based on the available communication resources being unused in the other wireless network.

The communication module 130 of the base station 104 includes a receiver, a transmitter, and associated circuitry or other components for communicating with the user device 102 via the wireless medium. The communication module 130 may be configured to communicate over a frequency range of the wireless medium and over multiple spatial layers. In some cases, the communication module 130 includes, or is coupled with, multiple hardware-based transceivers and antenna arrays that are configured to establish and manage wireless connections with multiple user devices. The base station 104 may transmit any suitable data or information to the user device 102 through the downlink 110, such as a schedule of allocated communication resources, downlink pilots, application data, wireless connection status information, or wireless connection control information.

Figure 2:
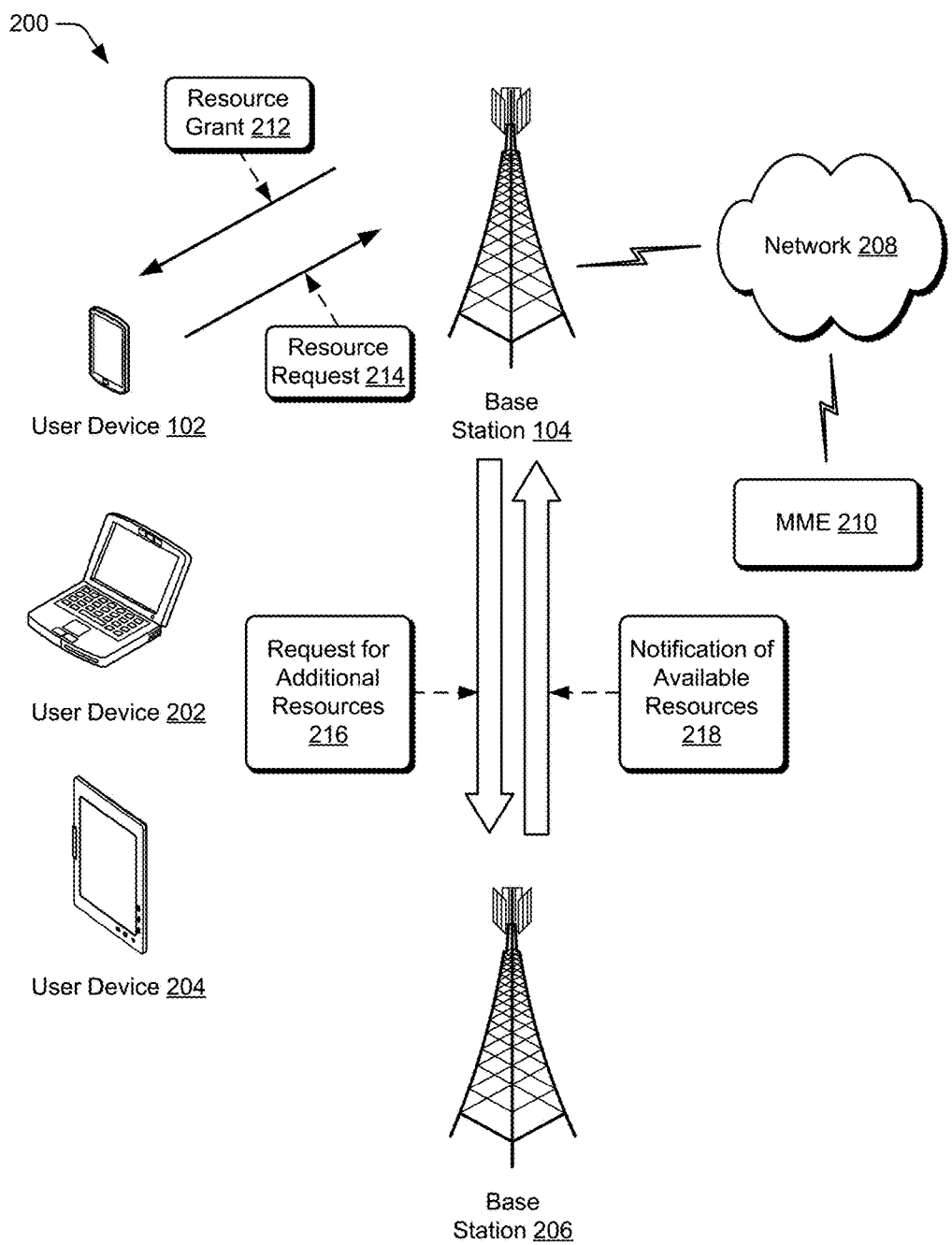
FIG. 2 illustrates an example networking environment in which two base stations may communicate with one or more user devices in accordance with one or more aspects of inter-radio access technology spectrum sharing.

FIG. 2 illustrates an example networking environment 200 in which two base stations may communicate with one or more user devices in accordance with one or more aspects of inter-RAT spectrum sharing. The networking environment 200 includes respective instances of the user device 102 and the base station 104, which provides a first wireless network with which the user device 102 and one or more other user devices 202 or 204 may associate. The networking environment 200 also includes another base station 206, which provides a second wireless network with which one or more of the user devices 102, 202, 204 or other user devices may associate. Through the networking environment 200, the base station 104 may enable or provide access to other networks or resources, such as a network 208 (e.g., the Internet) connected via a backhaul link (e.g., fiber network). Alternately or additionally, the networking environment 200 may include other base stations or a mobility management entity (MME) 210 to provide an area wide wireless network, such as a 5G NR network or an LTE network and associated data services.

The user devices 102, 202, and 204 may communicate with one or both of the base stations 104 or 206 through any suitable type or combination of channels, message exchanges, or network management procedures, and may operate according to communication protocols, such as those described herein. For example, the user device 102 and the base station 104 may communicate via one or more of a physical uplink control channel (PUCCH), a physical hybrid automatic repeat request (HARQ) indicator channel (PHICH), a physical random access channel (PRACH), a physical uplink share channel (PUSCH), or a physical downlink share channel (PDSCH). The base station 104 determines a schedule of communication resources for one or more channels to be used to communicate with the user device 102. After determining the schedule, the base station transmits a resource grant 212 to the user device 102. The resource grant 212 identifies communication resources that are allocated to one or more of the uplink 108 or the downlink 110 of the wireless connection 106. The resource grant 212 may specifically identify communication resources allocated to various channels of the wireless connection 106. Further, the resource grant 212 may represent multiple resource grants received over time.

The user device 102 receives the resource grant 212 and configures a communication module, such as the communication module 120, to receive or transmit data over the identified communication resources. The user device 102 may compare the resource grant 212 with an expected need for bandwidth to transmit and receive data. If the user device 102 determines that the expected need for bandwidth exceeds the resource grant 212, the communication resource request module 116 may request additional communication resources via a resource request 214. For example, if the user device 102 is streaming, or requests to stream, high-resolution video content, and the resource grant 212 is insufficient for receiving the high-resolution video content without lag or decreasing resolution, the user device 102 can transmit the resource request 214 to the base station 104. The resource request 214 may represent multiple resource requests transmitted over time.

If the base station 104 determines that it could use additional communication resources, it can transmit a request for additional resources 216 to the base station 206. The base station 104 can make this request based on a quantity of communication resources allocated to wireless connections with associated user devices exceeding a threshold percentage of total communication resources to which the base station 104 has access for providing the first wireless network. In some implementations, the base station 104 transmits the request for additional resources 216 based on receiving the resource request 214. Alternatively, the base station 104 transmits the request for additional resources 216 independently from receiving the resource request 214 for additional communication resources. Further, the base station 104 may provide a standing request for additional resources 216 whenever the base station 206 identifies available communication resources.

The base station 206 provides a second wireless network to user devices, which may include the user devices 102, 202, or 204. The second wireless network may use a legacy technology, such as an LTE-based wireless network. The legacy technology may have a lower data transmission bandwidth per allocated communication resource relative to the first RAT. Additionally or alternatively, the legacy technology may have a lower range relative to the first RAT.

The base station 206 transmits a notification of available resources 218 to the base station 104 to identify communication resources that are available to the base station 104 for providing the first wireless network. In some implementations, the notification of available resources 218 requests a confirmation from the base station 104 that the base station 104 will use the available communication resources. In such instances, the request for additional resources 216 may include the confirmation, or the confirmation may be sent independently.

The base station 206 may determine that communication resources can be made available based on identifying low-priority wireless connections with user devices. For example, the base station 206 may communicate with the user device 204 via a low-priority wireless connection. The wireless connection may be identified as a low-priority wireless connection based on past communications, a type of user device, a type of data communicated, or a designation of the wireless connection as low-priority by the user device. The low-priority wireless connection may be used, in example implementations, to transmit data to backup media stored on the user device 204 at regular timing intervals. The base station 206 can determine that a short delay, or increase in latency, in transmitting the backup data is tolerable. Therefore, the base station 206 delays the transmission and notifies that communication resources previously designated for the transmission are made available to the base station 104.

The base station 206 may use a resource manager or a shared spectrum manager to limit communication over the available communication resources by the base station 206 and associated devices. For example, the base station 206 may allocate, for communication with associated devices, communication resources in a schedule that avoids the available communication resources. Additionally or alternatively, the base station 206 may allocate the available communication resources as multimedia broadcast multicast service (MBMS) communication resources. This allocation may act as a place-holder to prohibit allocation of the available communication resources to a wireless connection of the second wireless network.

The base station 206 may transmit the notification of available resources 218 independently from any request from the base station 104. For example, the base station 206 may transmit the notification of available resources 218 based on determining that communication resources are not scheduled, or expected to be scheduled, for providing the second wireless network. Therefore, the request for additional resources 216 may be omitted as an unnecessary communication.

The notification of available resources 218 may identify communication resources by frequency and time. The frequency identification may include an available range of frequencies or a list of available frequencies. The list of available frequencies may include frequency ranges that are granular based on a frequency range of a resource block of the second wireless network. For example, in an LTE wireless network, a resource block spans 180 KHz, so the list of available frequencies may identify available frequencies with 180 KHz granularity.

The time identification may include an interval for which the available communication resources are available. The interval may be based in increments of time, such as 1, 5, 10, 100, 1,000, or 10,000 milliseconds, or transmission time intervals (TTIs), such as 1, 5, 10, 100, 1,000, 10,000 TTIs. Alternatively, the interval may be based on a trigger event. For example, the interval may extend until the base station 206 transmits a notification that the available communication resources are no longer available. In other examples, the interval may extend until the base station 104 has sufficient communication resources for providing the first wireless network without using the available communication resources. If the interval is based on a trigger event that is independent from the base station 206, the base station 104 may transmit, to the base station 206 or the MME 210, a notification that the base station 104 is no longer using the available communication resources.

The base station 104 may use the available communication resources to increase a bandwidth of one, some, or all wireless connections established between the base station 104 and user devices. Additionally, the base station 104 may establish wireless connections with additional user devices based on the available communication resources becoming available. For example, the user device 202 is a low-priority user device, and can tolerate high-latency between communications. The base station 104 establishes a wireless connection with the user device 202 when communication resources become available, such as when the base station 206 transmits the notification of available communication resources. The base station 104 then terminates the wireless connection with the user device 202 when the available communication resources are no longer available.

The base station 104 and the base station 206 may communication using a wired or wireless communication protocol. Additionally or alternatively, one or more of the base stations 104 or 206 may maintain dedicated communication resources for communicating wirelessly with the other base station 206 or 102. The base stations 104 and 206 may communicate directly or indirectly, such as communicating via an $X_n$ protocol, the network 208, a common MME, or respective, independent MMEs.

Figure 3:
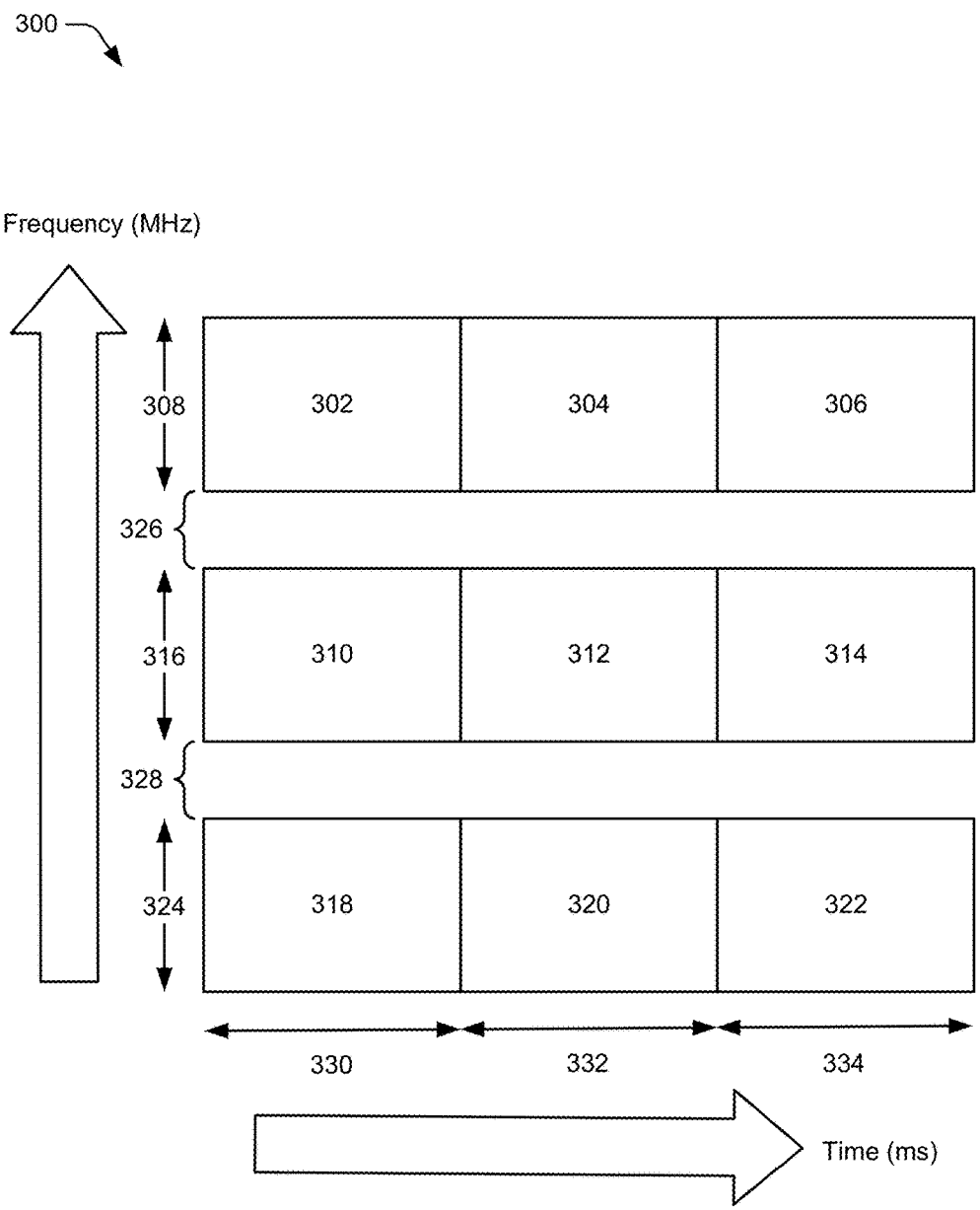
FIG. 3 illustrates frequency-time domain over which one or more base stations may provide wireless networks in accordance with one or more aspects of inter-radio access technology spectrum sharing.

FIG. 3 illustrates a frequency-time domain 300 over which one or more base stations may provide wireless networks in accordance with one or more aspects of inter-RAT spectrum sharing. A first wireless network has access to communication resources 302, 304, and 306 that span a frequency bandwidth 308. A second wireless network has access to communication resources 310, 312, and 314 that span a frequency bandwidth 316. A third wireless network has access to communication resources 318, 320, and 322 that span a frequency bandwidth 324. The frequency bandwidths 308 and 316 are separated by a gap 326. The frequency bandwidths 316 and 324 are separated by a gap 328. The communication resources 302, 310, and 318 span a time interval 330; the communication resources 304, 312, and 320 span a time interval 332; and the communication resources 306, 314, and 322 span a time interval 334. The communication resources 302, 304, 306, 310, 312, 314, 318, 320, and 322 may be sets of communication resources including multiple communication channels that include multiple resources blocks.

The frequency bandwidths 308 and 316 are adjacent and the frequency bandwidths 316 and 324 are adjacent based on not being separated by another frequency bandwidth that is occupied by another wireless network. However, the frequency bandwidth 308 is not adjacent to the frequency bandwidth 324 based on being separated by the frequency bandwidth 316 that is occupied by the second wireless network.

In some implementations of inter-RAT spectrum sharing, a first base station that provides the first wireless network receives a notification of available communication resources from a second base station that provides the second wireless network. The notification identifies the communication resources 312, or a portion thereof, as available to the first base station. The first base station then uses the available communication resources to expand into the frequency bandwidth 316 to increase a bandwidth of the first wireless network during the time interval 332. The first base station may also expand into the gaps 326 and 328 to further increase the bandwidth of the first wireless network during the time interval 332. After the time interval 332, the first base station ceases communication over the frequency bandwidth 316 and the second base station again has access to the frequency bandwidth 316 during the time interval 334.

The second base station may retain communication resources within the communication resources 312 to maintain the second wireless network. The second base station may retain communication resources according to resource block granularity. For example, the second base station may restrict the first base station from communicating over one or more portions of the communication resources 312 that include PSSs, SSSs, MIBs, SIBs, or downlink pilots. In some implementations, the second base station provides a notification to the first base station that identifies, as available communication resources, communication resources that would otherwise be designated for one or more of PUSCHs or PDSCHs within the second wireless network. In these implementations, the second base station may maintain communication resources designated for a PRACH.

Alternatively, the second base station may not retain communication resources within the communication resources 312 to maintain the second wireless network. Instead, the second base station may puncture one or more portions of the communication resources 312 to transmit or receive communications to maintain the second wireless network. The puncturing includes transmitting maintenance communications and may further include instructing the first base station to mute transmissions during the transmitting of the maintenance communications. This puncturing can be coordinated with the first base station. For example, it may be beneficial for the second base station to preserve one or more of PSSs, SSSs, MIBs, and SIBs of the second wireless network; however, entire channels or entire resource blocks may be unnecessary. Therefore, the second base station may identify, as available communication resources, one or more of the channels or resource blocks that would otherwise carry the PSSs, SSSs, MIBs, and SIBs of the second wireless network. The second base station can then puncture the identified channels or resource blocks to send the PSSs, SSSs, MIBs, and SIBs, which puncturing may be coordinated with the first base station.

Figure 4:
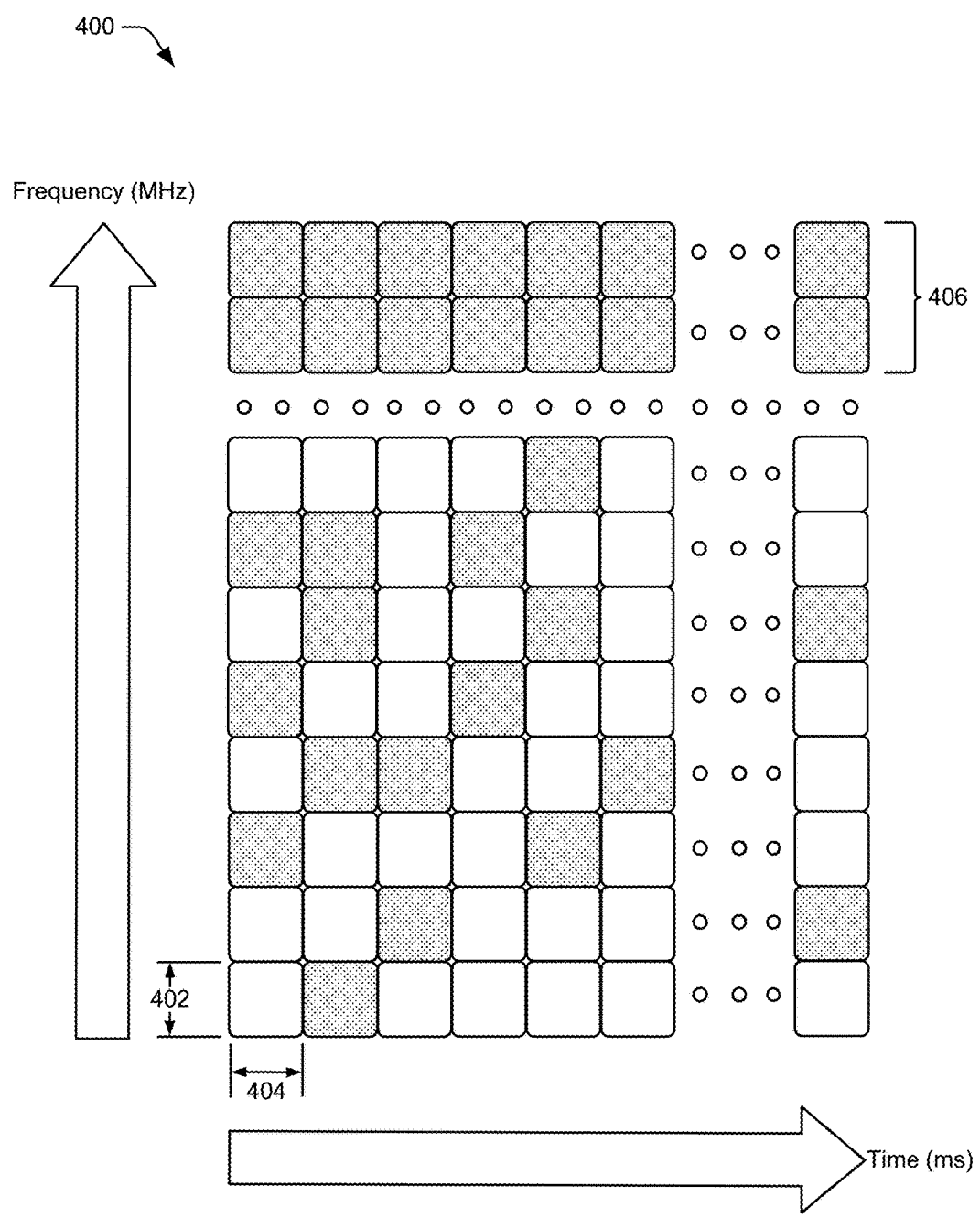
FIG. 4 illustrates an example set of communication resources available to base stations for communicating with user devices.

FIG. 4 illustrates an example set 400 of communication resources available to the base station 206 for communicating with user devices. Communication resources of the set 400, as defined by a communication protocol or standard, span a specified bandwidth 402 and a time interval 404. The communication resources, shown as boxes, may be resource blocks, groups of resource blocks, groups of resource elements, orthogonal frequency-division multiplexing (OFDM) symbols, single-carrier frequency-division multiplexing (SC-FDM) symbols, or other denominations of communication resources. The communication resources that are scheduled for providing wireless connections with the user devices are illustrated with shading. In some implementations, the communication resources occupying a frequency range 406 are allocated to maintain a second wireless network provided by the base station 206 (the second wireless network). For example, the communication resources occupying the frequency range 406 may include one or more of a PRACH, PSSs, SSSs, MIBs, or SIBs.

In example implementations of inter-RAT spectrum sharing, the base station 206 identifies available communication resources as those that are unused for providing wireless connections with the user devices. The base station 206 transmits the notification of available resources 218 to identify some or all of the unused communication resources. Additionally, the base station 206 may identify, as available communication resources, communication resources designated for low-priority wireless connections. Further, the base station 206 may identify all, or substantially all, communication resources as available for a time interval. The base station may continue to transmit one or more of PSSs, SSSs, MIBs, or SIBs by puncturing, or interfering with, transmissions by another base station over the communication resources.

Figure 5:
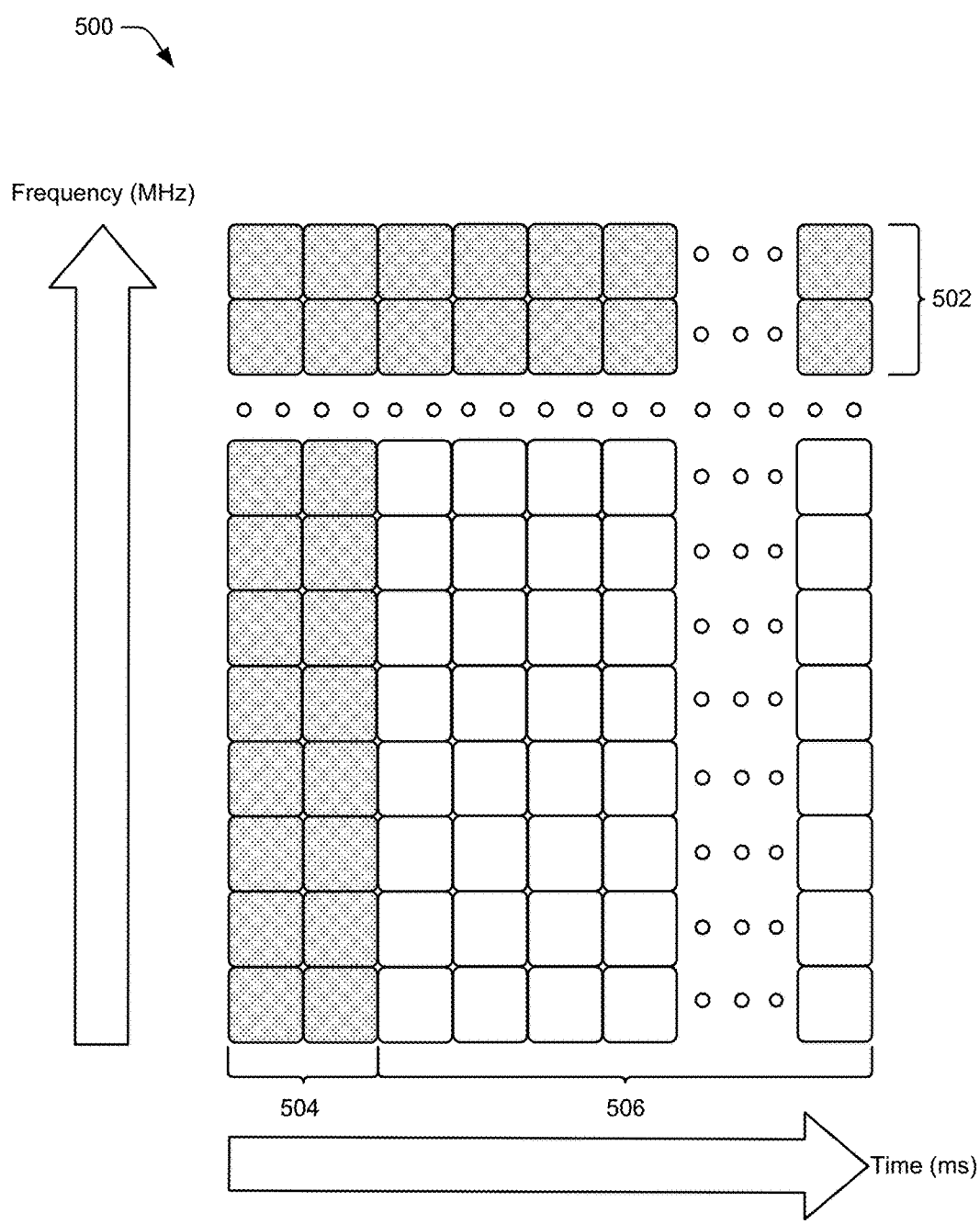
FIG. 5 illustrates another example set of communication resources available to a base station for communicating with user devices.

FIG. 5 illustrates an example set 500 of communication resources available to the base station 206 for communicating with user devices. The communication resources may be resource blocks, groups of resource blocks, groups of resource elements, orthogonal frequency-division multiplexing (OFDM) symbols, single-carrier frequency-division multiplexing (SC-FDM) symbols, or other denominations of communication resources. The communication resources that are scheduled for providing wireless connections with the user devices are illustrated with shading. In some implementations, the communication resources occupying a bandwidth 502 are allocated to maintain a wireless network provided by the base station 206 (the second wireless network). The communication resources occupying the bandwidth 502 may include one or more of a PRACH, PSSs, SSSs, MIBs, or SIBs.

The example set 500 of communication resources are organized to separate the set 500 into a time-based division of used communication resources and unused communication resources. An interval 504 of time is allocated for communicating via the second network. The used communication resources are assigned to the interval 504 that includes one or more time slots, subframes, or frames. Another interval 506 of time is allocated for unused communication resources. The base station 206 may schedule any unused communication resources to the interval 506. Alternatively, the base station 206 may allocate the communication resources within the interval 506 as MBMS communication resources.

By organizing the set 500 into a time-based division of used communication resources and unused communication resources, the base station can transmit the notification of available resources 218 to the base station 104 that identifies a relatively wide bandwidth of available communication resources for a period of time.

Figure 6:
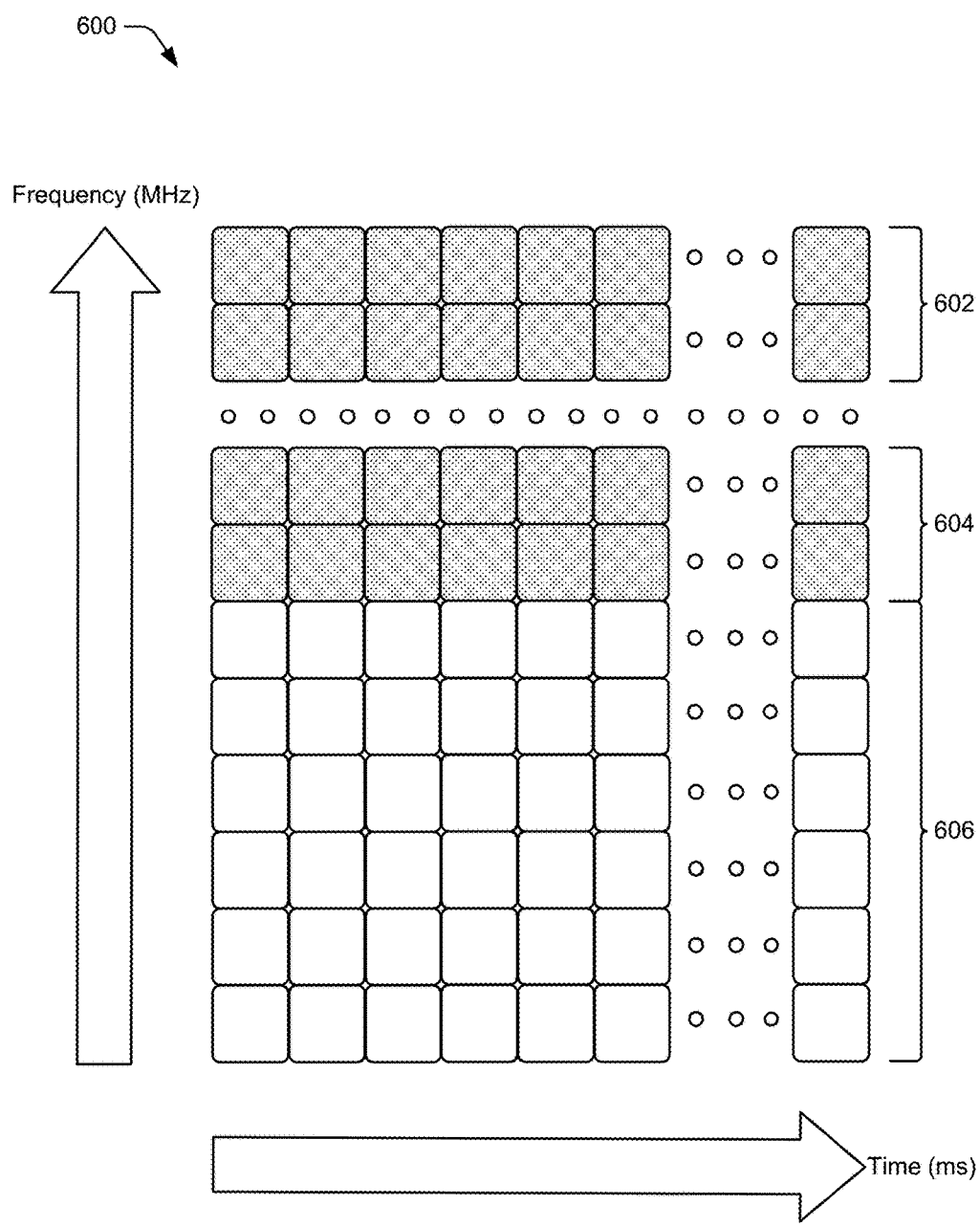
FIG. 6 illustrates another example set of communication resources available to a base station for communicating with user devices.

FIG. 6 illustrates an example set 600 of communication resources available to the base station 206 for communicating with user devices. The communication resources may be resource blocks, groups of resource blocks, groups of resource elements, orthogonal frequency-division multiplexing (OFDM) symbols, single-carrier frequency-division multiplexing (SC-FDM) symbols, or other denominations of communication resources. The communication resources that are scheduled for providing wireless connections with the user devices are illustrated with shading. In some implementations, the communication resources occupying a bandwidth 602 are allocated to maintain a wireless network provided by the base station 206 (the second wireless network). The communication resources occupying the bandwidth 602 may include one or more of a PRACH, PSSs, SSSs, MIBs, or SIBs.

The example set 600 of communication resources are organized to separate the set 500 into a frequency-based division of used communication resources and unused communication resources. A bandwidth 604 of time is allocated for communicating via the second network. The used communication resources are assigned to the bandwidth 604 that spans one or more subcarriers, resource blocks, or channels. In some implementations, the bandwidth 604 is be positioned, in a frequency domain, immediately above or below the bandwidth 602. Another bandwidth 606 is allocated for unused communication resources. The base station 206 may schedule any unused communication resources to the bandwidth 606. Alternatively, the base station 206 may allocate the communication resources within the bandwidth 604 as MBMS communication resources.

By organizing the set 600 into a frequency-based division of used communication resources and unused communication resources, the base station can transmit the notification of available resources 218 to the base station 104 that identifies a bandwidth of available communication resources for a relatively long period of time.

Figure 7:
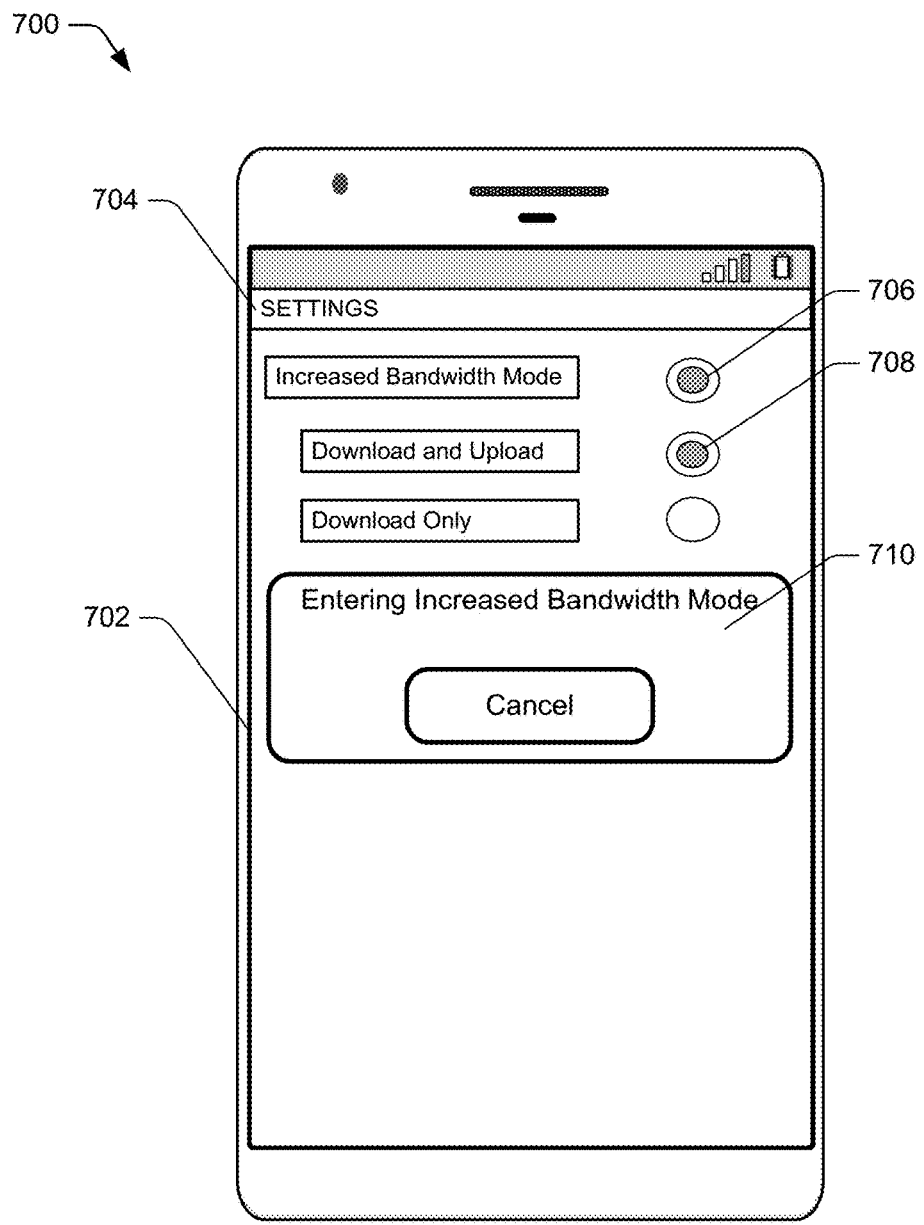
FIG. 7 illustrates a user interface of a user device through which one or more aspects of inter-radio access technology spectrum sharing can be implemented.

FIG. 7 illustrates an example user interface 700 of the user device 102 through which one or more aspects of inter-RAT spectrum can be implemented. In this example, the user interface 700 is presented through a visible portion of a display 702 for providing output to a user. The display 702 may also include, or be integrated with, a touch screen or touch-sensitive overlay for receiving touch input from the user. In some cases, the display 702 provides or makes accessible a settings menu 704 through which the user interface 700 can receive input 706 to select an increased bandwidth mode. The settings menu 704 for the multi-carrier communication modes can receive a further input 708 to request one or more modes, such as a download and upload mode or a download only mode.

Upon receiving a selection to request an increased bandwidth mode, the user device may transmit, to the base station 104, a request to enter the increased bandwidth mode. The request may be included within the resource request 214, or may be sent independently via a channel of the wireless connection 106. The resource manager 126 may grant the request to enter the increase bandwidth mode based on receiving a notification of available resources 218. Further, based on receiving the request to enter the increased bandwidth mode, the base station 104 may transmit the request for additional resources 216 to the base station 206.

Additionally or alternatively, the user device 102 may provide a notification 710 via the user interface 700 to indicate that the user device 102 is entering the multi-carrier mode, based on a receipt of a resource grant for additional resources. The notification 710 is illustrated in this example as a pop-up notification in the display 702, however, other forms of notification 710 may be implemented in addition or in alternative to the pop-up notification. For example, the user device 102 may provide an audible notification, a visible notification via a light emitting diode (LED) indicator that is separate from the display 702, or a motion-based notification such as a vibration of the user device 102.

The user interface 700 is but one of many possible user interfaces for implementing inter-RAT spectrum sharing. Although the user device 102 is illustrated as a smart phone with a touch screen, alternative user interfaces may be implemented by the user device 102. For example, the user device 102 may be implemented as a laptop with a user interface including one or more of a mouse, a track pad, a keyboard, a microphone, a monitor, a projector screen, or speakers. In some implementations, the user interface does not include the settings menu 704 for receiving the inputs 706 or 708, but rather, the user device 102 enters the increased bandwidth mode automatically and without receiving user input.

Techniques for Implementing Inter-RAT Spectrum Sharing

Figure 8:
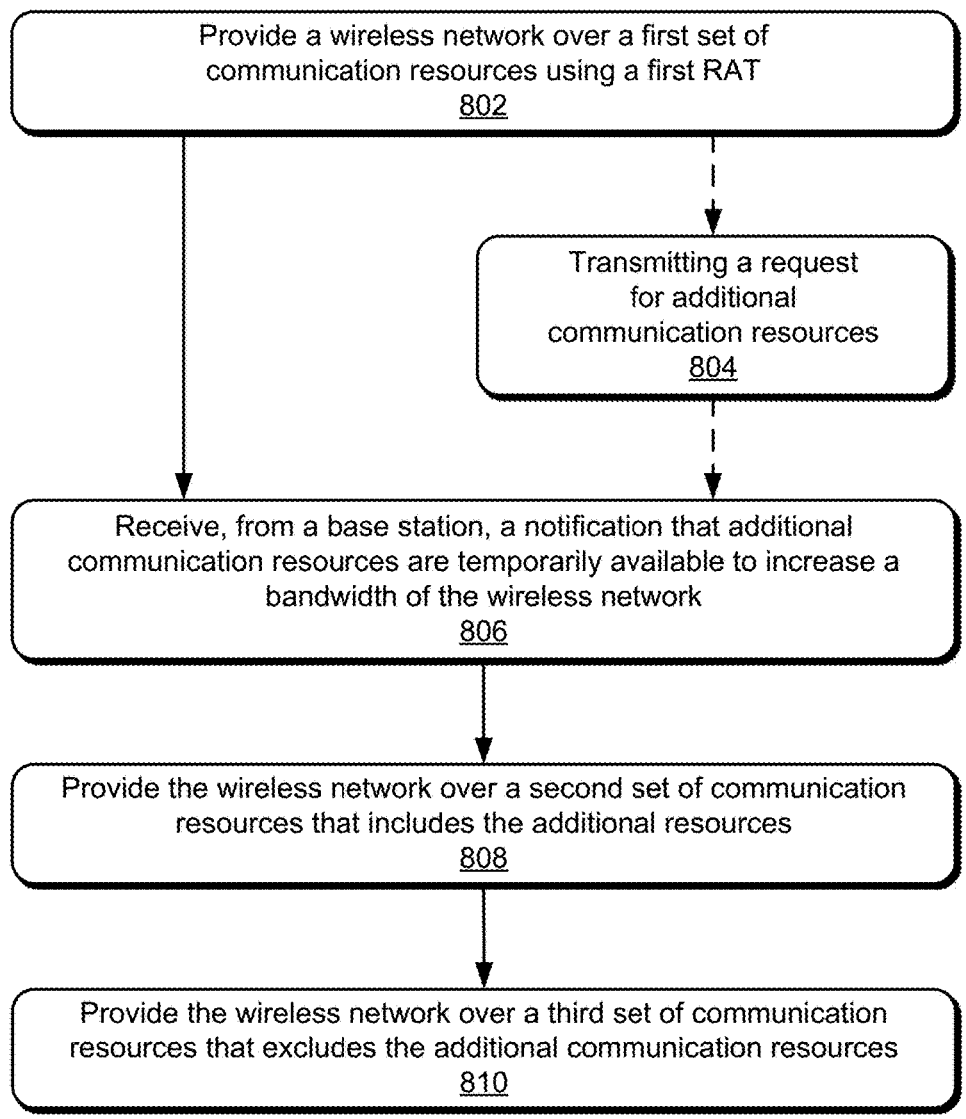
FIG. 8 illustrates an example method performed by a base station for inter-radio access technology spectrum sharing.
Figure 9:
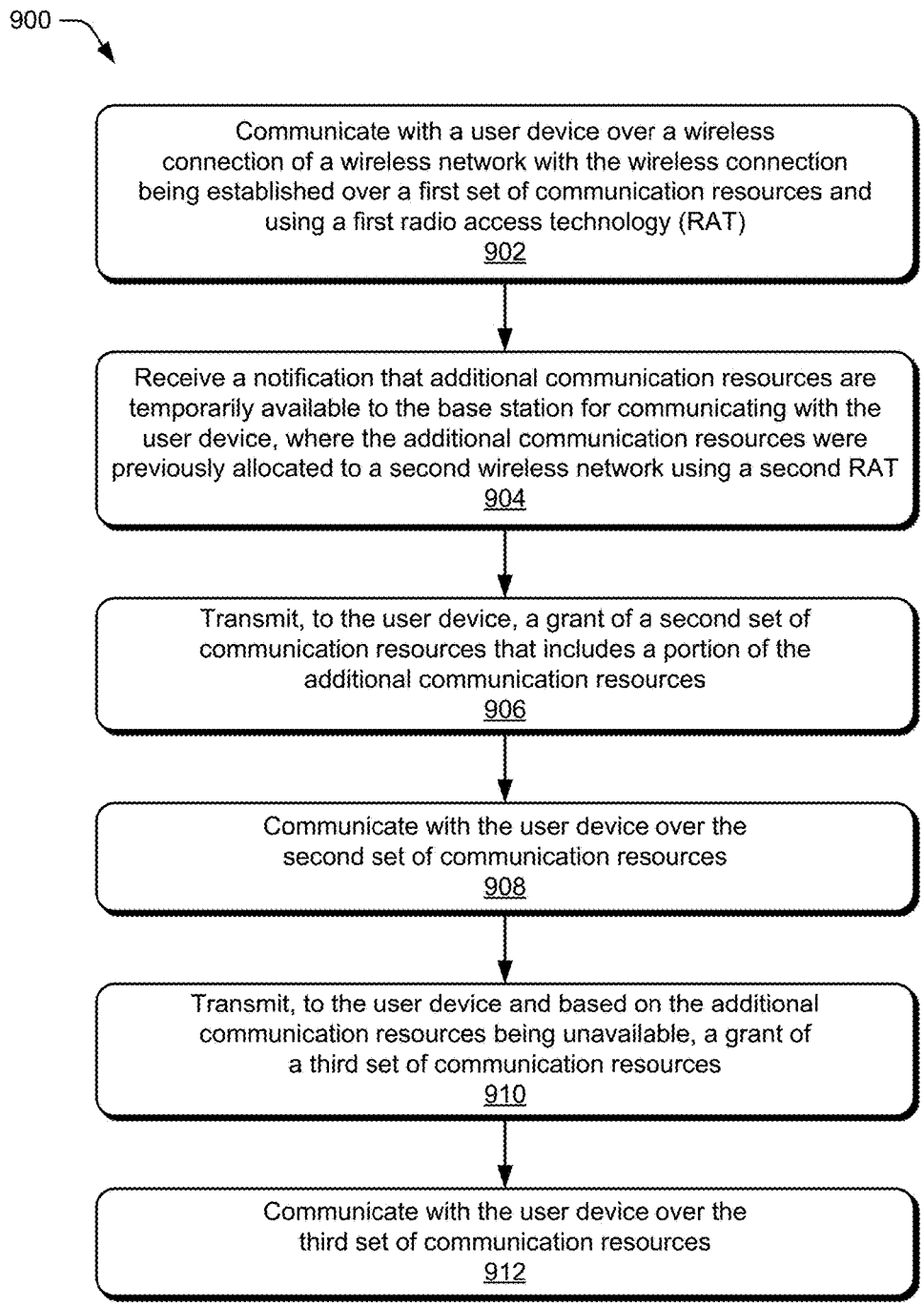
FIG. 9 illustrates another example method performed by a base station for inter-radio access technology spectrum sharing.
Figure 10:
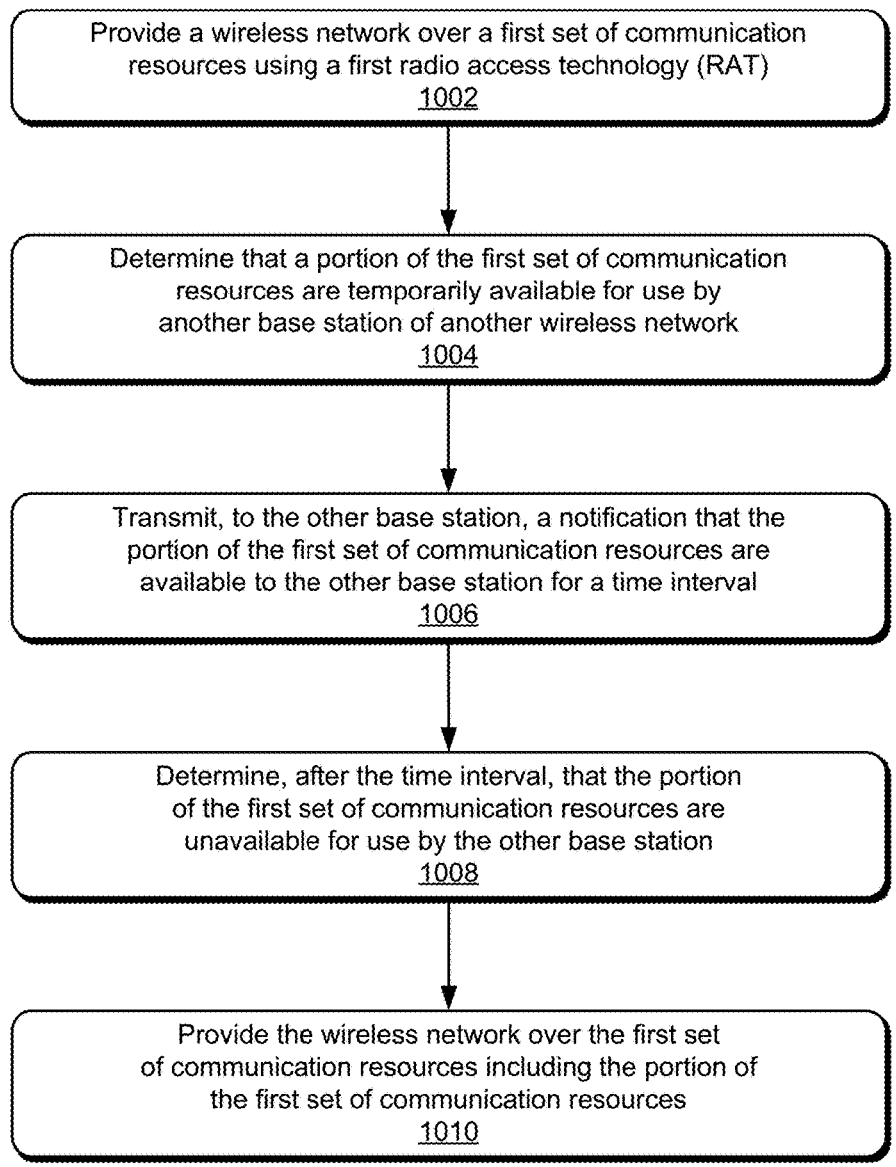
FIG. 10 illustrates an example method performed by a base station for inter-radio access technology spectrum sharing.

FIGS. 8-10 depict methods for implementing inter-RAT spectrum sharing in wireless networks. These methods are shown as sets of blocks that specify operations performed but are not necessarily limited to the order or combinations shown for performing the operations by the respective blocks. For example, operations of different methods may be combined, in any order, to implement alternate methods without departing from the concepts described herein. In portions of the following discussion, the techniques may be described in reference to FIGS. 1-7, reference to which is made for example only. The techniques are not limited to performance by one entity or multiple entities operating on one device, or those described in these figures.

FIG. 8 illustrates an example method 800 performed by a base station for inter-RAT spectrum sharing. The method 800 includes operations that may be performed by a resource manager, such as the resource manager 126, a shared spectrum manager, such as the shared spectrum manager 128, and a communication module, such as the communication module 130. In some aspects, operations of the method 800 may allow for sharing frequency spectrum by a legacy wireless network to another, more-advanced wireless network.

At operation 802, a base station of a wireless network provides the wireless network over a first set of communication resources using a first RAT. For example, the base station 104 provides a wireless network over the communication resources 302. The base station 104 may operating using an advanced protocol. For example, the base station may operate using a 5G NR protocol.

At optional operation 804, the base station transmits a request for additional communication resources. The base station may transmit the request using a transceiver, such as a hardware-based transceiver, of a communication module. For example, the resource manager 126 of the base station 104 determines that the base station 104 could use additional communication resources to improve communication with associated user devices. For example, the wireless network provided by the base station may have an increased bandwidth per allocated communication resource, relative to a legacy network.

At operation 806, the base station receives, from another base station, a notification that additional communication resources are temporarily available to increase a bandwidth of the wireless network. The base station may receive the notification using the transceiver of a communication module. The additional communication resources are useable by the base station to increase a bandwidth of the wireless network. Also, the additional communication resources may have been previously allocated to another wireless network using a second RAT that is different from the first RAT. For example, the base station 206 transmits the notification of available resources 218 to the base station 104. The notification may identify communication resources, such as the communication resources 312, which had been previously allocated to a network provided by the base station 206. The base station 206 may operating using a legacy protocol.

At operation 808, the base station provides the wireless network over a second set of communication resources that includes the additional communication resources. For example, the base station 104 provides the wireless network over one or more of the communication resources 312 or 314. The wireless network may have an increased bandwidth by addition the communication resources 312 or 314 to the communication resources 304 and 306, which are already allocated for providing the wireless network.

At operation 810, the base station provides the wireless network over a third set of communication resources that excludes the additional communication resources. The base station may provide the wireless network over the third set of communication resources based on the additional communication resources no longer being available to the base station. For example, the base station 104 may cease providing the wireless network over communication resources in the frequency bandwidth 316 after providing the network over the communication resources 312. The base station 104 may be notified within the notification of available resources 218 that the communication resources are no longer available after the communication resources 312. Alternatively, the base station 206 may transmit an independent notice that the communication resources within the frequency bandwidth 316 are no longer available.

FIG. 9 illustrates an example method 900 performed by a base station for inter-RAT spectrum sharing. The method 900 includes operations that may be performed by a resource manager, such as the resource manager 126, a shared spectrum manager, such as the shared spectrum manager 128, and a communication module, such as the communication module 130. In some aspects, operations of the method 900 may allow for sharing frequency spectrum by a legacy wireless network to another, more-advanced wireless network.

At operation 902, a base station communicates with a user device over a wireless connection of a first wireless network. The wireless connection is established over a first set of communication resources and uses a first RAT. For example, the base station 104 communicates with the user device 102 over the wireless connection 106. The base station may use a hardware-based transceiver of the communication module 130 to transmit to, and receive data from, the user device 102. As illustrated in FIG. 3, the base station 104 communicates with the user device over a set of communication resources including the communication resources 302.

At operation 904, the base station receives a notification that additional communication resources are temporarily available to the base station for communication with the user device. The additional communication resources were previously allocated to a second wireless network using a second RAT. As illustrated in FIG. 2, the base station 104 receives the notification of available resources 218 from the base station 206. The notification identifies, for example, the communication resources 312 as available communication resources. Because the communication resources 312 are within the frequency bandwidth 316 assigned to the second wireless network, the communication resources 312 are considered have been previously allocated to the second wireless network occupying the frequency bandwidth 316.

At operation 906, the base station transmits, to the user device, a grant of a second set of communication resources that includes a portion of the additional communication resources. For example, the base station 104 uses a hardware-based transceiver of the communication module 130 to transmit the resource grant 212. The resource grant 212 may identify a portion of the communication resources 312 as available for communication between the base station 104 and the user device 102.

At operation 908, the base station communicates with the user device over the second set of communication resources. For example, the base station 104 communicates with the user device 102 over the portion of the communication resources 312 using a hardware-based transceiver of the communication module 130. The communication may include high-volume data transfers such as video streaming, large file downloads, or large file uploads. This may be facilitated by a bandwidth of the second set of communication resources being greater than a bandwidth of the first set of communication resources.

At operation 910, the base station transmits, to the user device, a grant of a third set of communication resources. The base station transmits the grant based on the additional communication resources being unavailable. The grant of the third set of communication resources may exclude the additional communication resources. For example, the base station 104 uses a hardware-based transceiver of the communication module 130 to transmit the resource grant 212. The grant may identify communication resources within the communication resources 306.

At operation 912, the base station communicates with the user device over the third set of communication resources. For example, the base station 104 communicates with the user device 102 over communication resources of the communication resources 306 using a hardware-based transceiver of the communication module 130. A bandwidth of the third set of communication resources may be less than the bandwidth of the second set of communication resources. Further, the bandwidth of the third set of communication resources may be substantially equal to the bandwidth of the first set of communication resources.

FIG. 10 illustrates an example method 1000 performed by a base station for inter-RAT spectrum sharing. The method 1000 includes operations that may be performed by a resource manager, such as the resource manager 126, a shared spectrum manager 128, and a communication module, such as the communication module 130. In some aspects, operations of the method 1000 may allow for sharing frequency spectrum by a legacy wireless network to another, more-advanced wireless network.

At operation 1002, a base station provides a wireless network over a first set of communication resources. The wireless network uses a first RAT. For example, the base station 206 provides a wireless network using communication resources within the frequency bandwidth 316. More specifically, the base station may provide the wireless network over the communication resources 310.

At operation 1004, the base station determines that a portion of the first set of communication resources are temporarily available for use by another base station of another wireless network. For example, the base station 206 identifies a portion of the communication resources within the frequency bandwidth 316 as temporarily available. More specifically, the base station 206 may identify at least a portion of the communication resources 312 as available. As discussed above, the base station 206 may identify communication resources as available based on the communication resources being unallocated to an associate user device or based the communication resources being allocated to a low-priority user device or communication. The base station 206 may further organize the available communication resources into groups of resources blocks, such as illustrated by the sets 500 and 600.

At operation 1006, the base station transmits, to the other base station, a notification that the portion of the first set of communication resources are temporarily available for use by the other base station for a time interval. The other base station operated using a second RAT that is different from the first RAT. The base station may use a hardware-based transceiver of a communication module to transmit the notification. For example, the base station 206 transmits the notification of available resources 218 to the base station 104. The notification of available resources 218 may provide a defined amount of time for which the available communication resources are available or define a time at which availability of the available communication resources terminates. Alternatively, the notification of available resources 218 may define a trigger event that terminates the availability of the available communication resources or provide an open availability of the available communication resources until another communication from the base station 206 terminates the availability of the available communication resources.

At operation 1008, the base station determines, after the time interval, that the portion of the first set of communication resources are available for use by the other base station. For example, the base station 206 determines that the time interval 332 has expired. Alternatively, the base station 206 determines that a trigger event occurs, such as exceeding a threshold quantity of user devices communicating with the base station 206 over the wireless network.

At operation 1010, the base station provides the wireless network over the first set of communication resources including the portion of the first set of communication resources. The base station may use a hardware-based transceiver of a communication module to provide the wireless network. For example, the base station 206 provides the wireless network over the communication resources 314 within the frequency bandwidth 316.

Although techniques using, and apparatuses for implementing, inter-RAT spectrum sharing have been described in language specific to features and/or methods, it is to be understood that the subject of the appended claims is not necessarily limited to the specific features or methods described. Rather, the specific features and methods are disclosed as example ways in which user inter-RAT spectrum sharing can be implemented.

What is claimed is:

1. A method for inter-radio access technology spectrum sharing performed by a base station of a wireless network, the method comprising:
   providing the wireless network over a first set of communication resources, the wireless network using a first radio access technology (RAT);
   receiving a notification that additional communication resources are temporarily available to the base station, the additional communication resources being useable to increase a bandwidth of the wireless network and the additional communication resources having been previously allocated to another wireless network using a second RAT that is different from the first RAT;
   providing the wireless network over a second set of communication resources, the second set of communication resources including the additional communication resources; and
   providing, based on the additional communication resources no longer being available to the base station, the wireless network over a third set of communication resources, the third set of communication resources excluding the additional communication resources.

2. The method as recited in claim 1, wherein the second set of communication resources has a bandwidth that is greater than a bandwidth of the first communication resources.

3. The method as recited in claim 1, further comprising, before receiving the notification, transmitting a request for the additional communication resources, the request transmitted to another base station or a mobility management entity that manages the other wireless network using the second RAT.

4. The method as recited in claim 1, wherein the base station receives the notification from another base station based on the other base station making available resources previously designated for low-priority wireless communications.

5. The method as recited in claim 1, wherein the second RAT uses a technology having a lower data transmission bandwidth per allocated communication resource relative to the first RAT.

6. The method as recited in claim 1, wherein:
   the first set of communication resources occupies a first frequency bandwidth;
   the additional communication resources occupy a second frequency bandwidth; and
   the first frequency bandwidth is adjacent to the second frequency bandwidth.

7. The method as recited in claim 6, wherein the second set of communication resources includes a third frequency bandwidth that is adjacent to the second frequency bandwidth.

8. The method as recited in claim 1, wherein:
   providing the wireless network over the second set of communication resources includes establishing a wireless connection with a user device; and
   providing the wireless network over the third set of communication resources includes terminating the wireless connection with the user device.

9. A base station comprising:
   a processor;
   a hardware-based transceiver: and
   a computer-readable storage medium having stored thereon instructions that, responsive to execution by the processor, cause the processor to perform operations comprising:
      providing a first wireless network over a first set of communication resources and using a first radio access technology (RAT);
      receiving a notification that additional communication resources are temporarily available to the base station for increasing a bandwidth of the first wireless network, the additional communication resources having been previously allocated to a second wireless network using a second RAT that is different from the first RAT;
      providing the first wireless network over a second set of communication resources, the second set of communication resources including a portion of the additional communication resources; and
      providing, based on the additional communication resources being unavailable, of the first wireless network over a third set of communication resources.

10. The base station as recited in claim 9, wherein the additional communication resources are temporarily available in increments of transmission time intervals of the second wireless network.

11. The base station as recited in claim 9, wherein the base station receives the notification from another base station of the second wireless network.

12. The base station as recited in claim 9, wherein the second set of communication resources has a bandwidth that is greater than a bandwidth of the first set of communication resources.

13. The base station as recited in claim 9, wherein the third set of communication resources has a bandwidth that is substantially equal to a bandwidth of the first set of communication resources.

14. A method for inter-radio access technology spectrum sharing performed by a base station of a wireless network, the method comprising:
   providing the wireless network over a first set of communication resources, the wireless network using a first radio access technology (RAT);
   determining that a portion of the first set of communication resources are temporarily available for use by another base station of another wireless network;
   transmitting, to the other base station, a notification that the portion of the first set of communication resources are available to the other base station for a time interval, the other base station using a second RAT that is different from the first RAT;
   determining, after the time interval, that the portion of the first set of communication resources are unavailable for use by the other base station; and
   providing the wireless network over the first set of communication resources including the portion of the first set of communication resources.

15. The method as recited in claim 14, further comprising receiving, from the other base station, a request to make available the portion of the first set of communication resources.

16. The method as recited in claim 15, further comprising, in response to receiving the request, making available the portion of the first set of communication resources by increasing a latency of one or more wireless connections of the wireless network.

17. The method as recited in claim 14, further comprising allocating the portion of the first set of communication resources as multimedia broadcast multicast service (MBMS) communication resources.

18. The method as recited in claim 14, further comprising transmitting one or more synchronization signals over the portion of the first set of communication resources during the time interval.

19. The method as recited in claim 14, wherein the time interval is one or more transmission time intervals.

20. The method as recited in claim 14, wherein the first RAT is a technology having a lower data transmission bandwidth per allocated communication resource relative to the second RAT.

* * * * *

UNITED STATES PATENT AND TRADEMARK OFFICE
CERTIFICATE OF CORRECTION

PATENT NO. : 10,455,429 B2  
APPLICATION NO. : 15/917257  
DATED : October 22, 2019  
INVENTOR(S) : Jibing Wang and Erik Richard Stauffer Page 1 of 1

It is certified that error appears in the above-identified patent and that said Letters Patent is hereby corrected as shown below:

In the Claims

Column 18, Line 16, after "unavailable," before "the" delete "of"

Signed and Sealed this  
Twenty-sixth Day of November, 2019

Andrei Iancu  
*Director of the United States Patent and Trademark Office*